UNITED STATES PATENT OFFICE.

KARL IMHOFF, OF BREDENEY, NEAR ESSEN-ON-THE-RUHR, GERMANY.

PROCESS OF DRYING SLUDGE.

1,056,548. Specification of Letters Patent. Patented Mar. 18, 1913.

No Drawing. Application filed September 28, 1910. Serial No. 584,198.

*To all whom it may concern:*

Be it known that I, KARL IMHOFF, a subject of the German Emperor, and residing at Bredeney, near Essen-on-the-Ruhr, Germany, have invented a certain new and useful Improved Process of Drying Sludge, of which the following is a specification.

My invention relates to the disposal of sludge and a primary object is to provide an improved process of rapidly drying sludge and making so-called dry mud of the same.

The sludge which is obtained by separation from the sewage of cities, waste water of factories, mills, etc., is utilized after being drained of water and dried, either as a fertilizer, or as a fuel when this can be conveniently and advantageously done, or as a dumping-material for filling up low ground. The product obtained by draining and drying the sludge is known as "dry mud".

When decomposing sludge in water under pressure in a chamber, the gases, which are evolved, collect in the form of small bubbles and a part of the gases is dissolved in the water. Now I have found that when the sludge is carefully removed so that it is relieved from the pressure of the water to which it was subjected and in such manner that as little gas as possible is allowed to escape, in consequence of the diminished pressure the bubbles of gas increase in volume and a part of the dissolved gases is liberated. Owing to the gases the sludge, which was previously heavier than water, now occupies more space and becomes lighter than water, flows more readily in this state, and forms a foamy, spongy mass. A large part of the water contained in the sludge then percolates through the pores in the sludge liberated from the gases and, in contradistinction to other sludge, settles below and not above the solid matter. When the sludge containing gas is conveyed to a drained drying ground the water runs away quickly below the solid matter and dry mud is obtained in an exceedingly short time. When sludge contains insufficient or no gas I subject it to similar artificial treatment. I may increase the volume of gas in the sludge by depriving the sludge of water in an evacuated chamber. Or I may artificially incorporate gases, *e. g.* air, in the sludge, for example by mixing them with or blowing them into the sludge, or by mixing with the sludge substances, *e. g.* calcium carbid, which generate or contain gases, or by starting or aiding in the sludge biological or other processes which contribute toward the formation of gases. When the sludge does not sufficiently retain the bubbles of gas formed in it, I may add to it substances which favor the formation of foam, such as soap, for example.

I claim:

1. The herein described process of drying sludge, which consists in incorporating gas under pressure in the sludge so as to change it into a spongy mass, then delivering the so-treated sludge while relieving it of pressure whereby the sludge becomes lighter and floats on the liquid contained in the sludge, and then draining the liquid contained in the sludge so that dry mud is obtained.

2. The herein described process of drying sludge, which consists in mixing the sludge with a substance by which gas is generated under pressure therein so as to change it into a spongy mass, then delivering the so-treated sludge while relieving it of pressure whereby the sludge becomes lighter and floats on the liquid contained in the sludge, and then draining the liquid contained in the sludge so that dry mud is obtained.

3. The herein described process of drying sludge, which consists in adding to the sludge a substance which renders it capable of retaining bubbles of gas, next incorporating a gas therein under pressure whereby the sludge is changed into a spongy mass that floats on the liquid contained therein, and then draining the liquid from the floating mass so that dry mud is obtained.

KARL IMHOFF. [L. S.]

Witnesses:
 WALTER VONNEGUT,
 ALFRED HENKEL.